(12) United States Patent
Heor

(10) Patent No.: US 7,369,466 B2
(45) Date of Patent: May 6, 2008

(54) OPTICAL PICKUP APPARATUS AND METHOD FOR CONTROLLING PHASES OF THREE BEAMS

(75) Inventor: Tae-Youn Heor, Wuwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 542 days.

(21) Appl. No.: 10/984,907

(22) Filed: Nov. 10, 2004

(65) Prior Publication Data
US 2005/0073921 A1 Apr. 7, 2005

(51) Int. Cl.
G11B 7/00 (2006.01)

(52) U.S. Cl. .................. 369/44.37; 369/44.41

(58) Field of Classification Search ............. 369/44.37, 369/44.41
See application file for complete search history.

(56) References Cited

U.S. PATENT DOCUMENTS

| | | | | |
|---|---|---|---|---|
| 5,610,879 | A * | 3/1997 | Moriya et al. ........... | 369/13.24 |
| 5,715,218 | A * | 2/1998 | Ikeda ...................... | 369/44.29 |
| 6,587,481 | B1 * | 7/2003 | Seong et al. ............... | 372/9 |
| 6,597,642 | B1 * | 7/2003 | Ijima et al. .............. | 369/44.11 |
| 2002/0003766 | A1 * | 1/2002 | Kadowaki et al. ..... | 369/112.07 |

FOREIGN PATENT DOCUMENTS

| | | |
|---|---|---|
| KR | 2001-0047945 | 6/2001 |
| KR | 2001-0111641 | 12/2001 |

* cited by examiner

Primary Examiner—Wayne Young
Assistant Examiner—LaTanya Bibbins
(74) Attorney, Agent, or Firm—Roylance, Abrams, Berdo & Goodman, L.L.P.

(57) ABSTRACT

An optical pickup apparatus and method are provided. The apparatus and method include a light source unit having a holder in which an optical module having first and second light sources for emitting light having different wavelengths and a grating are installed, an optical path changer for changing a path of the light emitted from the first or second light sources, an object lens for focusing light passing through the optical path changer on a relatively thin disc or a relatively thick disc, and a photodetector unit. The photodetector unit includes a first photodetector having a first main photodetector, a first sub-photodetector, and a second sub-photodetector for receiving light diffracted into three beams by the grating and reflected by the relatively thin disc and converting the received light into an electrical signal, and a second photodetector having a second main photodetector, a third sub-photodetector, and a fourth sub-photodetector for receiving light diffracted into three beams by the grating and reflected by the relatively thick disc and converting the received light into an electrical signal.

8 Claims, 6 Drawing Sheets

OPTICAL PICKUP APPARATUS AND METHOD FOR CONTROLLING PHASES OF THREE BEAMS

CROSS REFERENCE TO RELATED APPLICATIONS

This application is related to Korean Patent Application No. 2003-10973, filed on Feb. 21, 2003, and laid open on Aug. 30, 2004 in the Korean Intellectual Property Office, the entire contents of which is incorporated herein by reference.

BACKGROUND OF THE INVENTION

1. Field of the Invention

The present invention relates to a compatible optical pickup apparatus and a method for controlling the phases of three beams. More particularly, the present invention relates to a compatible optical pickup apparatus which can simultaneously control focus offset and phases of three beams with respect to discs having different thicknesses, and a method for controlling the phases of the three beams.

2. Description of the Related Art

An optical pickup is used to record or reproduce data with respect to an optical disc and includes a light emitting portion and a light receiving portion. The light emitting portion allows light emitted from a light source to be incident on the disc. The light receiving portion allows light reflected from the disc to be received by a photodetector so that data is reproduced or a servo is performed.

Figure 1A:
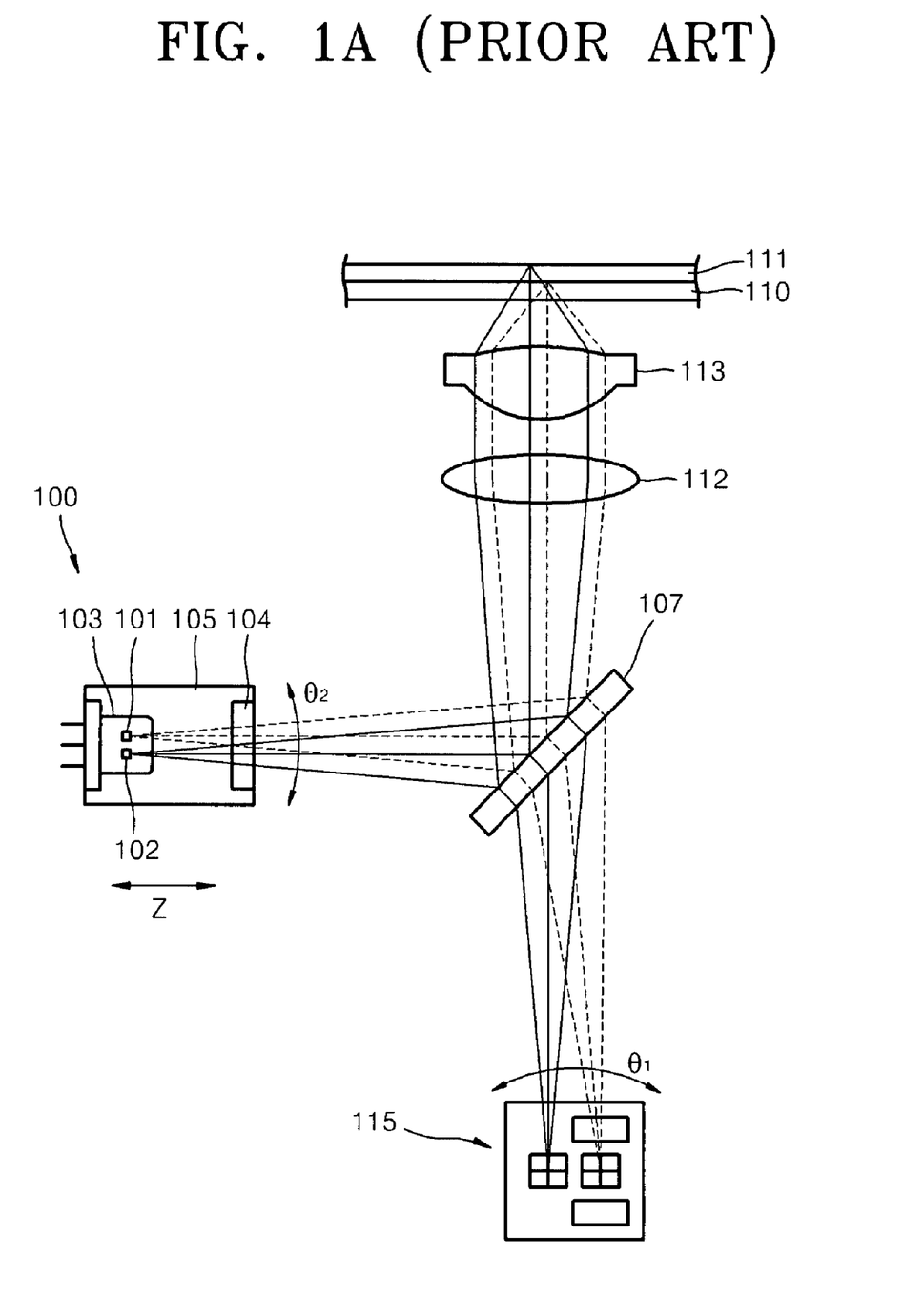
FIGS. 1A and 1B are views illustrating a conventional optical pickup apparatus.

Referring to FIG. 1A, a conventional compatible optical pickup apparatus includes an optical module 103 having a first light source 101 emitting light having a wavelength of about 650 nm and a second light source 102 emitting light having a wavelength of about 780 nm, a light source unit 100 having a grating 104 supported by a holder 105 and dividing light emitted from the first and second light sources 101 and 102 into three beams for performing a tracking servo or focusing servo function, a beam splitter 107 for changing a proceeding path of the light emitted from the first and second light sources 101 and 102, an object lens 113 for focusing light reflected from the beam splitter 107 on first and second discs 110 and 111, and a photodetector unit 115 for detecting light by receiving the light reflected from the first and second discs 110 and 111. A collimating lens 112 for converting incident light into a parallel beam is provided between the beam splitter 107 and the object lens 113.

Figure 1B:
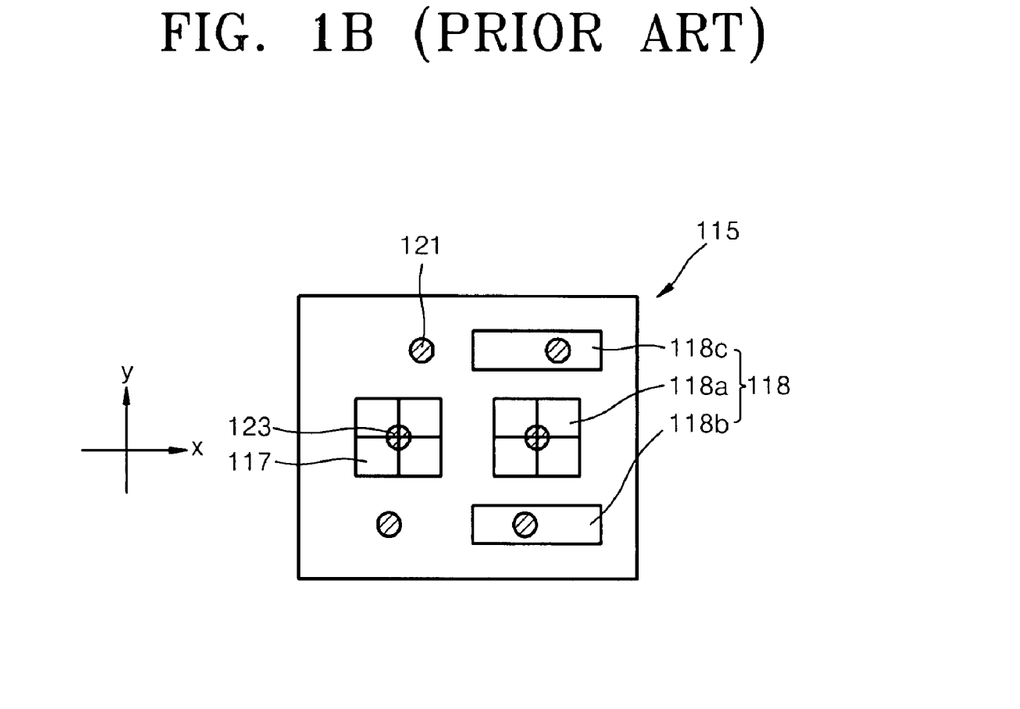

The first light source 101 is used for the first disc 110 which is relatively thin while the second light source 102 is used for the second disc 111 which is relatively thick. The light emitted from the first and second light sources 101 and 102 is reflected by the beam splitter 107 and proceeds toward the first and second discs 110 and 111. After being reflected from the firs and second discs 110 and 111, the light passes through the beam splitter 107 and is received by the photodetector unit 115. The photodetector unit 115, as shown in FIG. 1B, includes a first photodetector 117 for detecting the light reflected from the first disc 110 and a second photodetector 118 for detecting the light reflected from the second disc 111. The first photodetector 117 has a four-section structure. The second photodetector 118 includes a main photodetector 118a having a four-section structure and a pair of sub-photodetectors 118b and 118c arranged on both sides of the main photodetector 118a.

The light emitted from the first and second light sources 101 and 102 are diffracted into three beams by the grating 104. A tracking error is detected using the three beams in a differential phase detecting method with respect to the first disc 110 and a three beam method or a push-pull method with respect to the second disc 111. The first photodetector 117 used for the differential phase detector comprises a four-section photodetector. Among a $+1^{st}$ order beam 121, a $-1^{st}$ order beam 122, a $0^{th}$ order beam 123, which are diffracted by the grating 104, only the $0^{th}$ order beam 123 is formed on the first photodetector 117. Thus, the $+1^{st}$ order beam 121 and the $-1^{st}$ order beam 122 are not used in detecting track errors of the first disc 110. Since the differential phase method, the three beam method, and the push-pull method are widely known techniques, detailed descriptions thereof are omitted.

According to the above structure, a compact disk (CD) and a digital video disk (DVD) can be compatibly recorded and reproduced using a pickup apparatus. However, during setting for the compatible optical pickup apparatus, an operation to satisfy conditions for reproducing and recording data for both CD and DVD is required. Since the CD and DVD have different data recording properties or are different in physical structure, satisfying all of the respective conditions is needed.

Figure 2A:
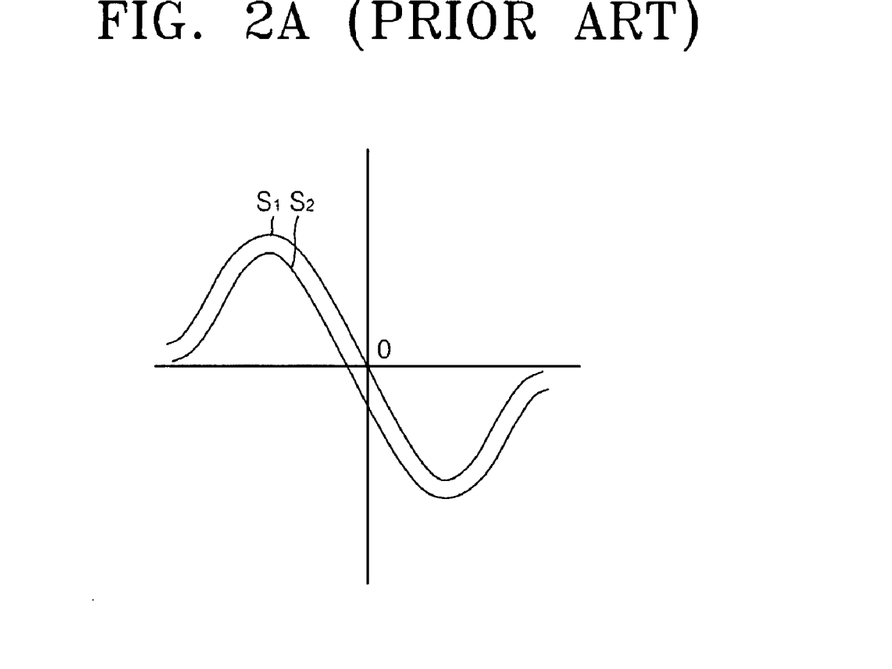
FIG. 2A is a graph showing the focusing offset and a S curve for indicating a focusing error signal detected by the optical pickup apparatus of FIG. 1.

For this purpose, it is common to first set the conditions for the DVD and then the conditions for the CD. To obtain a recording/reproducing performance with respect to a disc, conditions such as photodetector balance (PDB), RF level, focus offset, tracking offset, and phase must be satisfied. The PDB is used to adjust the light reflected from the disc for focusing at the center portion of the photodetector. FIG. 2A shows an S curve which indicates the occurrence of a focus error signal. Preferable focusing is obtained when the S curve passes the zero point 0 such as for a curve $S_1$. When the S curve is shifted and does not pass the zero point 0 such as for the curve $S_2$, a focus offset is generated. Since focusing is not normally performed when the focusing offset is generated, the S curve must be adjusted to pass the zero point 0.

Since the PDB and the focus offset are the most important conditions to meet, the following descriptions will focus on these conditions only. The photodetector is moved in x and y directions to adjust the PDB of the DVD while the light source unit 100 is moved in a z direction to adjust the focus offset. Thus, the positions of the light source unit 100 and the photodetector unit 115 for meeting the optimal conditions are fixed. After the setting for the DVD is complete, the conditions for the CD need to be met. However, since the optical conditions for the DVD are already met, the conditions for the CD need to be met without changing the present state of the DVD parameters. Thus, to meet the PDB for the CD, the positions of the light source unit 100 or the photodetector unit 115 must not be changed. Considering the above, to meet the PDB for the CD, the photodetector unit 115 is rotated without changing the position of the photodetector unit 115. Since the first photodetector 117 of the photodetector unit 115 is set to be optimal for the DVD, the photodetector unit 115 is rotated by a predetermined angle $\theta_1$ with respect to the first photodetector 117 so as not to change the position of the first photodetector 117.

Figure 2B:
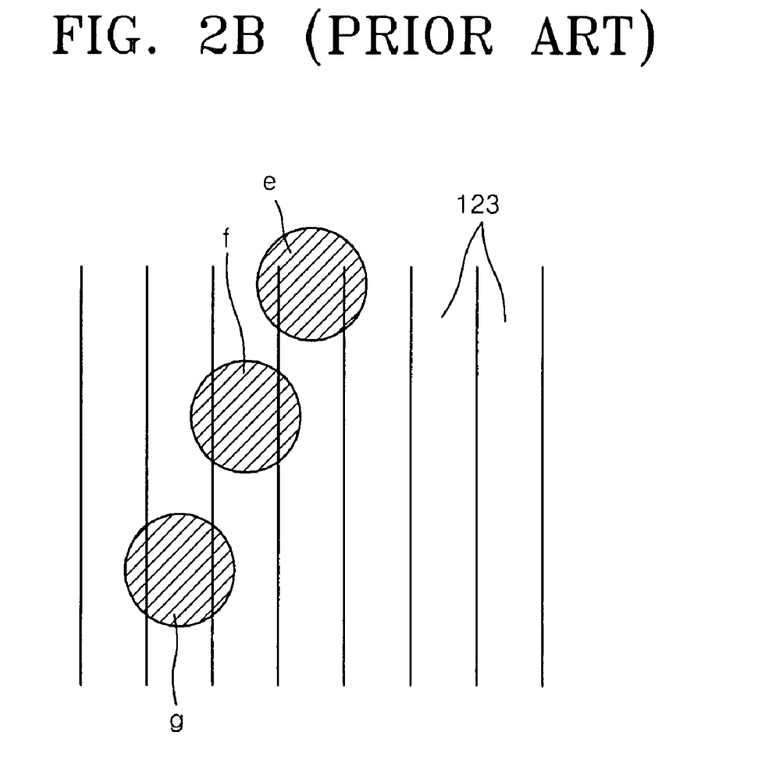
FIGS. 2B and 2C are views showing a state in which three beams are focused on a track and a tracking error signal is detected using the three beams, respectively.
Figure 2C:
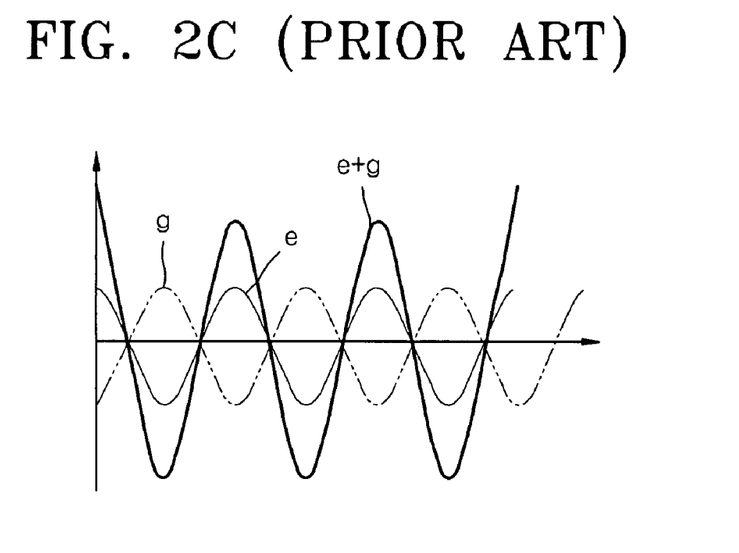

Next, for the tracking of the CD, a tracking error detection is performed using the three beam method. To accurately detect a tracking error, the phases of three beams must satisfy a predetermined angle, for example, 180°. The grating 104 is rotated to control the phases of three beams. The grating 104 is rotated so as not to change the position of the light source 100. In other words, since the first light source 101 is presently set to satisfy the optimal conditions for the DVD, the holder 105 is rotated by a predetermined angle $\theta_2$ with respect to the first light source 101 without changing the position of the first light source 101. When the grating 104 is rotated, as shown in FIGS. 2B and 2C, the phases of the three beams e, f, and g focused on a track 123 of the CD are controlled. In the graph of FIG. 2C, a tracking error signal by the beams e and g is shown and the phase difference between the beams e and g is 180°.

In adjusting the PDB with respect to the CD, although in the above description the photodetector unit 115 is rotated without changing the position of the first photodetector 117, the position of the first photodetector 117 practically changes. Thus, to readjust the PDB with respect to the DVD, an operation to adjust the position of the photodetector unit 115 needs to be performed. After the PDBs with respect to the DVD and the CD are repeated, an optimal PDB for both the DVD and CD can be obtained.

Also, in controlling the phases of three beams with respect to the CD, although in the above description the first light source 101 is not to be moved in the z direction when the holder 105 is rotated, the position of the first light source 101 is practically changed. Thus, to readjust the focus offset for the DVD, an operation to adjust the position of the light source unit 100 must be performed. After the focus offset for the DVD and the phases of three beams for the CD are repeatedly adjusted, optimal conditions can be obtained for both the DVD and CD.

However, in adjusting the PDB of the CD, since the effect by the rotation of the photodetector unit 115 on the PDB of the DVD is small, it is unnecessary to readjust the PDB of the DVD after adjusting the PDB of the CD, or the number of repeated adjustments is small. In contrast, when the holder 105 is rotated to control the phases of three beams for the CD, the rotation of the holder 105 greatly affects the focus offset of the DVD. Thus, since the adjustments need to be repeated to control the focusing offset of the DVD, a lot of time is required and labor efficiency is reduced.

SUMMARY OF THE INVENTION

To solve the above problems and to provide other benefits, the present invention provides an optical pickup which can simultaneously control the phases of three beams for tracking a relatively thick disc and the focusing offset of a relatively thin disc, and a control method thereof.

According to an aspect of the present invention, there is provided an optical pickup apparatus which comprises a light source unit having a holder in which an optical module having first and second light sources for emitting light having different wavelengths and a grating are installed, an optical path changer for changing a path of the light emitted from the first or second light sources, an object lens for focusing light passing through the optical path changer on a relatively thin disc or a relatively thick disc, and a photodetector unit comprising a first photodetector having a first main photodetector, a first sub-photodetector, and a second sub-photodetector for receiving light diffracted into three beams by the grating and reflected by the relatively thin disc and converting the received light into an electrical signal, and a second photodetector having a second main photodetector, a third sub-photodetector, and a fourth sub-photodetector for receiving light diffracted into three beams by the grating and reflected by the relatively thick disc and converting the received light into an electrical signal.

The optical path changer is a beam splitter or a polarization beam splitter. The first sub-photodetector and the third sub-photodetector are formed integrally and the second sub-photodetector and the fourth sub-photodetector are formed integrally.

According to another aspect of the present invention, there is provided a method for controlling phases of three beams diffracted by a grating and formed on a relatively thick disc when a compatible optical pickup apparatus is set. The compatible optical pickup apparatus includes an optical unit having a holder in which an optical module having first and second light sources for emitting light having different wavelengths and a grating are installed, and a photodetector unit for detecting light emitted from the first and second light sources and reflected from the relatively thick disc or a relatively thin disc. The method comprises obtaining a reference phase difference of three beams formed on the relatively thin disc when a phase difference of three beams are formed on the relatively thick disc, measuring a phase difference of three beams formed on the relatively thin disc and comparing the measured phase difference with the reference phase difference, and when the measured phase difference is different from the reference phase difference, adjusting the measured phase difference to be the same as the reference phase difference by moving or rotating the light source unit with respect to an optical axis.

Given that a length of a segment connecting a center of a main beam and a center of an auxiliary beam of the three beams formed on the relatively thick disc after being diffracted by the grating is $d_{CD}$ and a track pitch of the relatively thick disc is $q_{CD}$, and given that a length of a segment connecting a center of a main beam and a center of an auxiliary beam of the three beams formed on the relatively thin disc after being diffracted by the grating is $d_{DVD}$ and a track pitch of the relatively thin disc is $q_{DVD}$, the reference phase difference P is obtained from an equation in which $$P = \frac{4\pi H}{q_{DVD}} = \pi \frac{d_{DVD}}{d_{CD}} \frac{q_{CD}}{q_{DVD}}.$$

BRIEF DESCRIPTION OF THE DRAWINGS

The above and other features and advantages of the present invention will become more apparent by describing in detail embodiments thereof with reference to the attached drawings in which.

Throughout the drawings, it should be noted that the same or similar elements are denoted by like reference numerals.

DETAILED DESCRIPTION OF EXEMPLARY EMBODIMENTS

Figure 3:
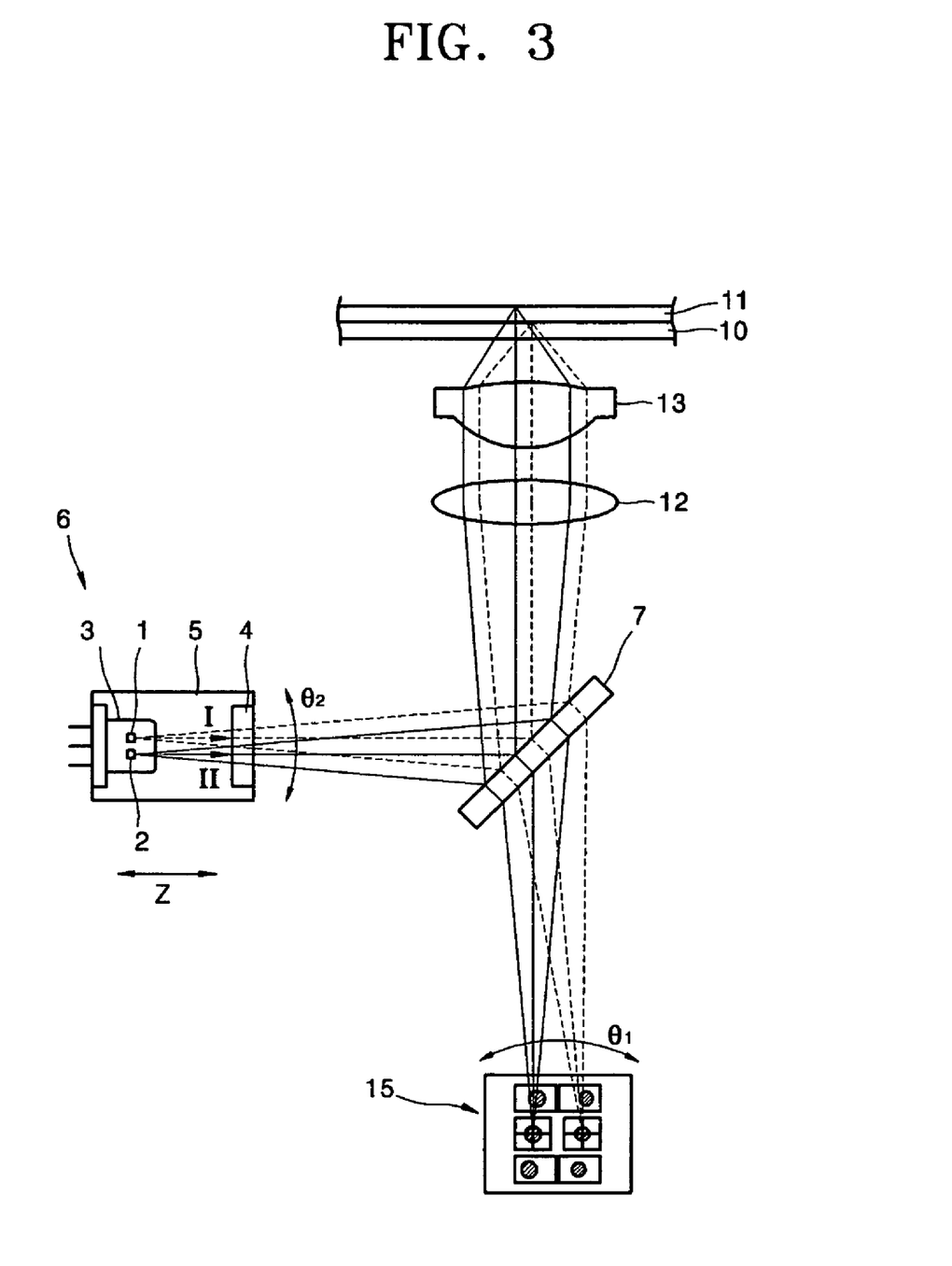
FIG. 3 is a view illustrating an optical pickup apparatus according to an embodiment of the present invention.

Referring to FIG. 3, an optical pickup apparatus according to an embodiment of the present invention includes a light source unit 6 for emitting first light I and second light II, an optical path changer 7 for changing a proceeding path of the first light I and the second light II, an object lens 13 for focusing light reflected by the optical path changer 7 on a relatively thin disc 10 or a relatively thick disc 11, and a photodetector unit 15 for detecting light reflected from the relatively thin disc 10 or the relatively thick disc 11 and converting the detected light into an electrical signal. A collimating lens 12 is provided between the object lens 13 and the optical path changer 7.

The light source unit 6 includes an optical module 3 in which a first light source 1 for emitting the first light I and a second light source 2 for emitting the second light II and a grating 4 for dividing the first light I and the second light II. The grating 4 is supported by a holder 5. The first light I has a wavelength of about 650 nm while the second light II has a wavelength of about 780 nm.

The optical path changer 7 may be a beam splitter or a polarized beam splitter. The relatively thin disc 10 may be a DVD while the relatively thick disc 11 may be a CD.

Figure 4A:
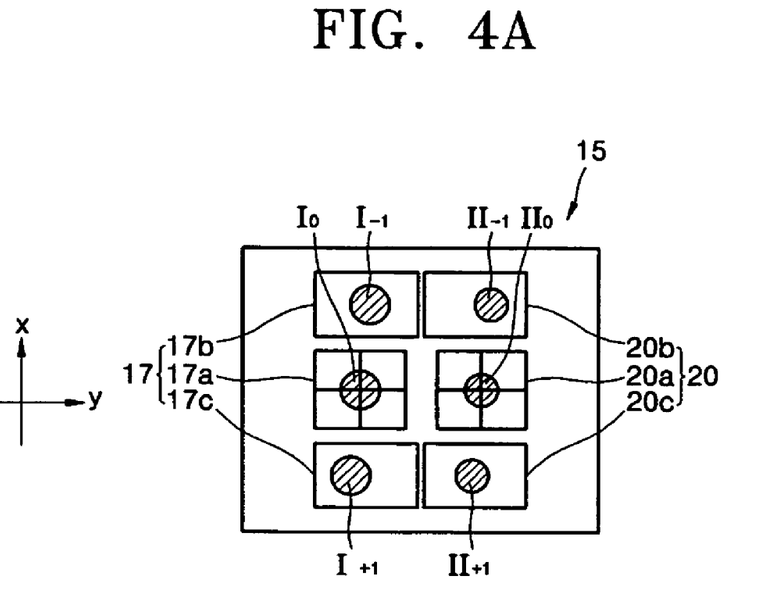
FIGS. 4A and 4B are views showing examples of photodetectors employed in the optical pickup apparatus of FIG. 3 according to an embodiment of the present invention.

The photodetector unit 15, as shown in FIG. 4A, includes a first photodetector 17 and a second photodetector 20. The first photodetector 17 includes a first main photodetector 17a having a four-section structure and first and second sub-photo detectors 17b and 17c. The second photodetector 20 includes a second main photodetector 20a having a four-section structure and third and fourth sub-photodetectors 20b and 20c.

The first main photodetector 17a and the first and second sub-photodetectors 17b and 17c receive a $0^{th}$ order beam $I_0$, a $+1_{st}$ order beam $I_{+1}$, and a $-1^{st}$ order beam $I_{-1}$ which are obtained by diffracting the first light I using the grating 4. The second main photodetector 20a and the third and fourth sub-photodetectors 20b and 20c receive a $0^{th}$ order beam $II_0$, a $+1^{st}$ order beam $II_{+1}$, and a $-1^{st}$ order beam $II_{-1}$, respectively, which are obtained by diffracting the second light II using the grating 4.

Figure 4B:
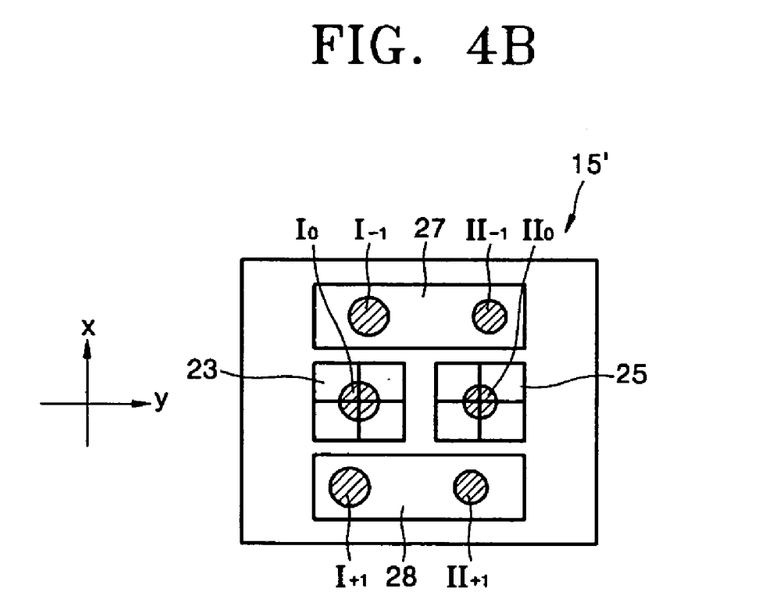

FIG. 4B shows the configuration of a photodetector unit 15' according to another embodiment of the present invention. The photodetector unit 15' includes third and fourth main photodetectors 23 and 25 respectively, each having a four-section structure, and fifth and sixth sub-photodetectors 27 and 28 arranged above and under the third and fourth main photodetectors 23 and 25. The fifth and sixth sub-photodetectors 27 and 28 are formed by incorporating the sub-photodetectors corresponding to the third and fourth main photodetector 23 and 25: Thus, the $+1^{st}$ order beam $I_{+1}$ of the light beams obtained as the first light I is diffracted by the grating 4, and the $+1^{st}$ order beam $II_{+1}$ of the light beams obtained as the second light II is diffracted by the grating 4, are received by the sixth sub-photodetector 28. Also, the $-1^{st}$ order beam $I_{-1}$ of the light beams obtained as the first light I is diffracted by the grating 4, and the $-1^{st}$ order beam $II_{-1}$ of the light beams obtained as the second light II is diffracted by the grating 4, are received by the fifth sub-photodetector 27. Accordingly, the sub-photodetector is commonly used for the first light I and the second light II.

A method of controlling the phases of three beams and the focusing offset using the optical pickup apparatus configured as above is described below.

The holder 5 is moved in a z direction to control the focusing offset of the relatively thin disc, for example, a DVD. After the focusing offset is controlled, a phase of a beam focused on the main photodetector 17a and the first and second sub-photodetectors 17b and 17c are measured. A phase of the beam for the relatively thin disc 10 is calculated such that the phase of the beam for the relatively thick disc 11, for example, a CD, is 180°.

Figure 5A:
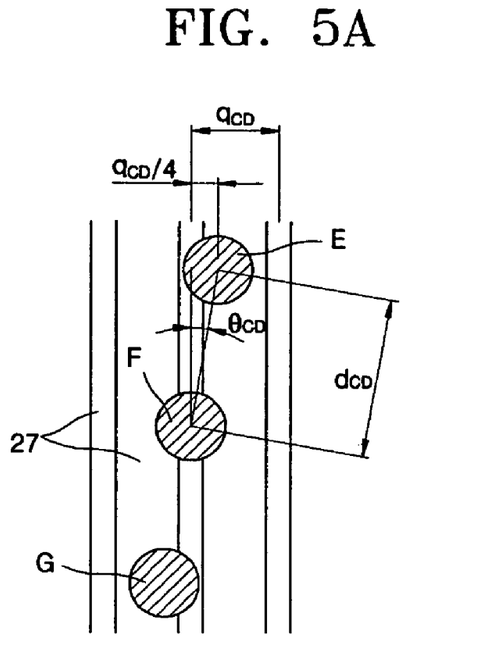
FIG. 5A is a view illustrating three beams focused on a CD according to an embodiment of the present invention.

FIG. 5A shows three beams focused on a CD. Given that the length of a segment connecting the center of a main beam F and the center of a $-1^{st}$ order auxiliary beam E is $d_{CD}$ and that the track pitch between tracks 27 is $q_{CD}$, an angle $\theta_{CD}$ between the track 27 and the segment connecting the center of a main beam F and the center of a $-1^{st}$ order auxiliary beam E is calculated as follows:

$$\theta_{CD} = \sin^{-1}\left(\frac{q_{CD}}{4d_{CD}}\right) \quad \text{[Equation 1]}$$

To create the phases of three beams 180°, the phase difference between electric outputs IE and IG of the beam E and a beam G must be 180° ($\pi$). To summarize the above, the following equation is obtained:

$$I_e = A \sin \omega t \quad I_g = A \sin(\omega t + \pi) = -A \sin \omega t \quad \text{[Equation 2]}$$

A tracking signal TE is calculated as follows by Equation 2:

$$TE = I_e - I_g 2A \sin \omega t \quad \text{[Equation 3]}$$

Figure 5B:
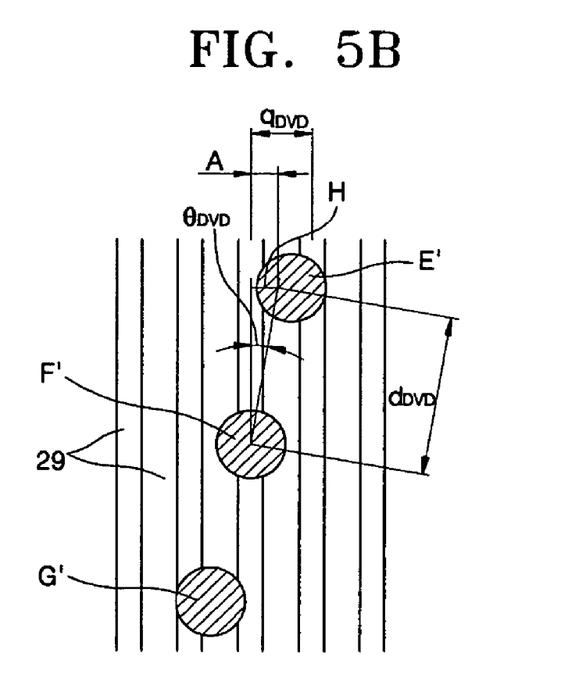
FIG. 5B is a view illustrating three beams focused on a DVD according to an embodiment of the present invention.

Equations 1-3 are obtained by assuming that the phase difference of three beams for the CD is 180°. When the phase difference of the three beams for the CD is 180°, the phase of the CD can be controlled at the set for the DVD by obtaining the phase difference for the DVD. FIG. 5B shows the three beams focused on the DVD when the phases of the three beams for the CD is set to 180°. An angle $\theta_{DVD}$ is obtained which is the same amount as an angle $\theta_{CD}$ when the phases of the three beams for the CD is 180°. As shown in FIG. 5B, given that the length of a segment connecting the center of a main beam F' and the center of a $-1^{st}$ order auxiliary beam E' is $d_{DVD}$ and that the length of a segment facing the angle $\theta_{DVD}$ having the same size as that of the angle $\theta_{CD}$ is H, the angle $\theta_{DVD}$ is obtained as follows:

$$\theta_{DVD} = \sin^{-1}\left(\frac{H}{d_{DVD}}\right) \quad \text{[Equation 4]}$$

$$H = \frac{d_{DVD} q_{CD}}{4 d_{CD}} \quad \text{[Equation 5]}$$

A three beam reference phase difference P for the DVD can be obtained using H as follows:

$$P = \frac{4\pi H}{q_{DVD}} = \pi \frac{d_{DVD}}{d_{CD}} \frac{q_{CD}}{q_{DVD}} \quad \text{[Equation 6]}$$

The reference phase difference P at the DVD which makes the phase difference of the three beams at the CD 180° can be obtained according to Equation 6. In Equation 6, $q_{DVD}$ is a track pitch of the relatively thin disc. The $q_{CD}$ may be 1.6 µm and the $q_{DVD}$ may be 0.74 µm. The three-beam phase difference at the CD can be inversely calculated using the reference phase difference P calculated according to Equation 6. In other words, when the three-beam phase difference at the DVD measured during the setting of the DVD is different from the reference phase difference P obtained according to Equation 6, the holder 5 is moved in the z direction or rotated at the angle θ such that the three-beam phase difference measured at the DVD equals the reference phase difference P. Thus, when the three-beam phase difference at the DVD equals to the reference phase difference P, the three-beam phase difference at the CD is 180°.

The auxiliary beams focused on the first and second sub-photodetectors 17b and 17c are not used to detect a DVD signal, but instead used to control the phases of the three beams with respect to the relatively thick disc, that is, the CD.

According to an embodiment of the present invention for controlling the phases of three beams, since the phases of the three beams at the CD can be controlled together during the setting of the DVD, the setting j of the DVD and CD can be simplified.

As described above, the optical pickup apparatus and the method for controlling the phases of three beams according to an embodiment of the present invention can be used for an optical pickup apparatus having a light source unit incorporating a DVD module and a CD module into a single module. Since an embodiment of the present invention provides a method for simultaneously controlling the focus offset for the DVD and the phases of the three beams for the CD during the setting of an optical system with respect to the DVD, the working of setting the CD and DVD can be simplified. In other words, the setting of the DVD and the setting of the CD do not need to be repeated inconveniently during the setting of the optical pickup apparatus. In addition, by reducing the focus offset of the DVD, the recording/reproducing performance of the disc is improved.

While the present invention has been particularly shown and described with reference to exemplary embodiments thereof, it should be understood by those of ordinary skill in the art that various changes in form and details may be made therein without departing from the spirit and scope of the present invention as defined by the following claims.

What is claimed is:

1. An optical pickup apparatus comprising:
a light source unit having a holder in which an optical module having first and second light sources for emitting light having different wavelengths and a grating are installed together;
an optical path changer for changing a path of the light emitted from the first or second light sources;
an object lens for focusing light passing through the optical path changer on a relatively thin disc or a relatively thick disc; and
a photodetector unit comprising:
a first photodetector having a first main photodetector, a first sub-photodetector, and a second sub-photodetector for receiving light diffracted into three beams by the grating and reflected by the relatively thin disc and converting the received light into an electrical signal; and
a second photodetector having a second main photodetector, a third sub-photodetector, and a fourth sub-photodetector for receiving light diffracted into three beams by the grating and reflected by the relatively thick disc and converting the received light into an electrical signal;
wherein beams focused on the first sub-photodetector and the second sub-photodetector are used to control the phases of the three beams with respect to the relatively thick disc.

2. The optical pickup apparatus as claimed in claim 1, further comprising a collimating lens provided between the optical path changer and the object lens to convert incident light into a parallel beam.

3. The optical pickup apparatus as claimed in claim 1, wherein the optical path changer is a beam splitter or a polarization beam splitter.

4. The optical pickup apparatus as claimed in claim 1, wherein the first light source has light of a wavelength of 650 nm and the second light source has light of a wavelength of 780 nm.

5. A method for controlling phases of three beams diffracted by a grating and formed on a relatively thick disc when a compatible optical pickup apparatus is set, the compatible optical pickup apparatus including an optical unit having a holder in which an optical module having first and second light sources for emitting light having different wavelengths and a grating are installed, and a photodetector unit for detecting light emitted from the first and second light sources and reflected from the relatively thick disc or a relatively thin disc, the method comprising:
obtaining a reference phase difference of three beams formed on the relatively thin disc when a phase difference of three beams are formed on the relatively thick disc;
measuring a phase difference of three beams formed on the relatively thin disc and comparing the measured phase difference with the reference phase difference; and
adjusting the measured phase difference to be the same as the reference phase difference by moving or rotating the light source unit with respect to an optical axis when the measured phase difference is different from the reference phase difference;
controlling, simultaneously, a focus offset for the relatively thin disc aid the phases of the three beams for the relatively thick disc during the setting of an optical system with respect to the relatively thin disc.

6. The method as claimed in claim 5, wherein the photodetector unit comprises:
receiving light diffracted into three beams by the grating and reflected by the relatively thin disc and converting the received light into an electrical signal via a first photodetector having a first main photodetector, a first sub-photodetector, and a second sub-photodetector; and
receiving light diffracted into three beams by the grating and reflected by the relatively thick disc and converting the received light into an electrical signal via a second photodetector having a second main photodetector, a third sub-photodetector, and a fourth sub-photodetector.

7. The method as claimed in claim 6, wherein the first sub-photodetector and the third sub-photodetector are formed integrally and the second sub-photodetector and the fourth sub-photodetector are formed integrally.

8. The method as claimed in claim 5, wherein, given that a length of a segment connecting a center of a main beam and a center of an auxiliary beam of the three beams formed on the relatively thick disc after being diffracted by the grating is $d_{CD}$ and a track pitch of the relatively thick disc is $q_{CD}$, and given that a length of a segment connecting a center of a main beam and a center of an auxiliary beam of the three beams formed on the relatively thin disc after being diffracted by the grating is $d_{DVD}$ and a track pitch of the relatively thin disc is $q_{DVD}$, the reference phase difference P is obtained from an equation in which $$P = \frac{4\pi H}{q_{DVD}} = \pi \frac{d_{DVD}}{d_{CD}} \frac{q_{CD}}{q_{DVD}}.$$

wherein H is a length of a segment facing an angle $\theta_{DVD}$ having the same size as that of an angle $\theta_{CD}$.

* * * * *